United States Patent [19]

Gonczy

[11] 4,318,897

[45] Mar. 9, 1982

[54] PROCESS FOR PREPARING HYDRIDED IRON-VANADIUM ALLOYS

[75] Inventor: Stephen T. Gonczy, Mt. Prospect, Ill.

[73] Assignee: UOP Inc., Des Plaines, Ill.

[21] Appl. No.: 179,139

[22] Filed: Aug. 18, 1980

[51] Int. Cl.$^3$ ................................................. C01B 6/24
[52] U.S. Cl. .................................. 423/644; 423/648 R
[58] Field of Search ........................... 423/644, 648 R; 75/123 J

[56] References Cited

FOREIGN PATENT DOCUMENTS 51-27890  3/1974  Japan ................................. 423/644

OTHER PUBLICATIONS

Kirschfeld et al., "Zeitschrift fur Elektrochemie", vol. 36, 1930, pp. 123–129.
Newkirk, "A Literature Study of Metallic Ternary & Quaternary Hydrides", Sep. 19, 1975, Lawrence Livermore Lab., Livermore, CA, 31 pp.
Reilly et al., "Scientific American", Feb. 1980, pp. 118–129.

*Primary Examiner*—Herbert T. Carter
*Attorney, Agent, or Firm*—James R. Hoatson, Jr.; Eugene I. Snyder; William H. Page, II

[57] ABSTRACT

Ferrovanadium alloys containing from about 5 to about 30% iron may be used as hydrogen storage systems. Such alloys have a hydrogen-to-metal ratio which may be as great as about 1, and may be dehydrided at temperatures less than about 200° C.

3 Claims, No Drawings

PROCESS FOR PREPARING HYDRIDED IRON-VANADIUM ALLOYS

BACKGROUND OF THE INVENTION

In the quest for substitutes for fossil fuels, attention frequently has turned to hydrogen as an alternate fuel. Its abundance in water insures a plentiful supply, and its combustion results in reformation of water in, at least ideally, a pollution-free process. However, major limitations in the exploitation of hydrogen-based energy production are storage and transportation difficulties. Storage as a gas requires the use of bulky, massive containers to contain hydrogen at high pressures. Storage as a liquid requires a substantial fraction of the energy available from hydrogen to be expended in the liquefaction process. Both modes of storage present hazard and safety problems, especially when hydrogen is envisioned as an energy source for motor vehicles.

Storage of hydrogen as a hydrided metal is a relatively recent development explored to obviate the problems enumerated above. This approach utilizes the property of certain metal alloys to dissolve hydrogen, that is, to incorporate hydrogen atoms into the metal lattice, and to form metal hydrides reversibly at moderate temperatures and pressures, thereby acting as a carrier or sponge for significant quantities of hydrogen to be used as a fuel. Such hydrided metal alloys are solids which are easily handled and which do not pose the safety problems associated with high pressure gaseous hydrogen or liquid hydrogen. The state of the art has been summarized by Reilly and Sandrock, Scientific American, February, 1980, pages 118-129.

SUMMARY OF THE INVENTION

An object of this invention is to provide a method of storing hydrogen using metal alloys, and to provide compositions therefor. An embodiment of this invention comprises contacting a preactivated alloy consisting essentially of from about 70 to about 95% vanadium and from about 5 to about 30% iron with hydrogen at a pressure of at least 1 atmosphere.

DESCRIPTION OF THE INVENTION

For a metal alloy to be useful as a hydrogen storage system it must readily absorb hydrogen and reversibly release it. These are the hydriding and dehydriding phases, respectively, of a hydrogen storage system. Generally, hydriding of a reversible metal hydride-forming alloy is an exothermic reaction, i.e., heat is given off during the hydriding cycle. Conversely, dehydriding is an endothermic reaction, which means that the hydrided alloy must be heated to cause release of hydrogen. Although it is an arbitrary criterion, we believe a temperature less than about 200° C. is the maximum desirable temperature which a hydrided alloy requires to undergo dehydriding.

The equilibrium hydrogen pressure is another important characteristic of hydrogen storing alloys. For general utility it is necessary that the equilibrium hydrogen pressure of a hydrided alloy be at least atmospheric pressure at the desired dehydriding temperature; an alloy delivering hydrogen at subatmospheric pressures during dehydriding is difficult to incorporate as an energy source in, for example, a motor vehicle.

It is important to realize that many alloys and metals incorporate hydrogen in distinct stages. Thus, for example, vanadium displays two discrete reactions with hydrogen.

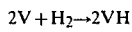

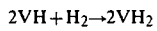

In the first stage there is formation of a relatively stable hydride whose decomposition or dehydriding occurs at a temperature well in excess of 200° C. In the second stage, there is formation of a less stable dihydride whose decomposition or dehydriding occurs at a temperature substantially less than 200° C. In the context of a hydrogen storage system, it is this second stage which is important. The hydrogen which is absorbed during hydriding and subsequently evolved during dehydriding at the temperatures and pressures of interest is termed recoverable hydrogen. In the above example, if dihydride formation is complete, the maximum amount of recoverable hydrogen is 1 atom per atom of vanadium, i.e, the atom ratio of recoverable hydrogen to metal is 1. To the extent that the second stage hydriding is incomplete it should be clear that the actual atom ratio of recoverable hydrogen to the metal may be less than 1.

A discovery of this invention is that various ferrovanadium alloys have properties desirable for a hydrogen storage system. Such systems have a substantial advantage over pure vanadium for this purpose because of their lower cost. Another advantage of ferrovanadium alloys accrues because a broad range of alloys can be prepared making it possible to construct a hydrogen storage system whose properties are best suited to the purpose of the user. Yet another advantage of ferrovanadium alloys as a hydrogen storage system is that such alloys can be readily reactivated if they are poisoned, which stands in contrast to pure vanadium. The alloys of this invention consist essentially of from about 70 to about 95% by weight vanadium and from about 5 to about 30% by weight of iron. This corresponds to an alloy whose atom fraction of iron is from about 0.05 to about 0.28. That is to say, the alloy can be represented by the formula $V_{(1-x)}Fe_x$ where x is from about 0.05 to about 0.28, preferably 0.09, more preferably 0.19.

The ferrovanadium alloys of this invention normally do not absorb hydrogen immediately after their preparation. It is necessary to activate such alloys by heating them in a vacuum and thereafter exposing the alloy to hydrogen, which activation step may correspond to the first stage of hydriding as discussed above. The temperature necessary for activation depends on the alloy, but generally is in the range from about 400° C. to about 650° C. It is to be understood that a necessary feature of this invention is the activation of ferrovanadium alloys prior to their use as a hydrogen storage system. Once activated, the alloys readily and reversibly undergo hydriding and dehydriding to afford recoverable hydrogen. Even after poisoning by, for example, exposure to air, the ferrovanadium alloys described herein may be reactivated by the aforementioned treatment.

As stated above, once activated the ferrovanadium alloys undergo reversible hydriding and dehydriding. The observed maximum amount of recoverable hydrogen of the activated alloys described herein may be as great as 1, i.e., there may be a maximum of about 1 atom of hydrogen stored per atom of metal. This implies that the hydrided activated alloy has a composition substantially corresponding to the formula $V_{(1-x)}Fe_xH_z$ where x is from about 0.05 to about 0.28, where H represents the recoverable hydrogen, and z has a value up to about 1.

The ferrovanadium alloys described herein may be commercially available preparations. Alternately, they can be readily prepared from the components iron and vanadium by mixing the two in appropriate proportions, melting them in an inert atmosphere, mixing the melt and the subsequently solidified material, and repeating the melting process until a homogeneous preparation is attained. The alloys so prepared are then activated as previously described.

The storage or hydriding phase of the alloys is conducted by contacting the alloy with hydrogen for a time sufficient to insure the attainment of equilibrium. The pressure of hydrogen employed depends on the alloy, the temperature, and whether the maximum absorption of hydrogen is desired. For materials described herein, a pressure less than about 50 atmospheres at a temperature under about 100° C. is sufficient for maximum absorption of hydrogen. It should be understood that the maximum absorption of hydrogen is necessary to attain the maximum amount of recoverable hydrogen.

The release of hydrogen, or dehydriding, is performed in a correspondingly facile manner. The alloy need only be heated to a temperature less than about 200° C. to cause hydrogen evolution. The rate of hydrogen evolution and its equilibrium pressure may be controlled by the applied temperature. The higher the temperature, the greater will be the rate and equilibrium hydrogen pressure.

The examples given below are for illustrative purposes only and it is to be understood that the invention is not limited thereto.

EXAMPLES

An iron-vanadium alloy of nominal 20% iron content was obtained from a commercial source. The source analysis was given as 79.4% vanadium, 0.51% silicon, 0.03% carbon, with the remainder (20.1%) iron. The alloy of 10% iron content was prepared by adding vanadium of 99.8% purity to the alloy described above in an amount sufficient to lower the iron content to 10%. The latter was triple melted under argon in an arc furnace and turned over between melts. The material so prepared was broken into chunks approximately ⅜ inch in diameter.

The hydriding system was constructed of stainless steel and consisted of a high pressure hydrogen source and a hydrogen reservoir, with tubing leading to the reaction chamber. The chamber was of all welded construction which was opened by drilling a ⅜ inch hole and closed by welding the hole shut. A sintered porous stainless steel filter which kept hydride particles as small as 4 microns in the chamber was in the top of the reaction chamber, and a thermocouple well was welded into the bottom of the chamber. Temperature was controlled either by immersion of the reaction chamber into a large temperature controlled water bath or into a vertical tube furnace.

The volume of the hydrogen reservoir was determined by weighing the reservoir after it was filled with water. The volume of the remainder of the system was calculated by filling the reservoir with hydrogen to a measured pressure, evacuating the remainder of the system, admitting hydrogen from the reservoir to the other parts of the system, and measuring the pressure drop.

Pieces of alloy were weighed and loaded into the reaction chamber. The loading hole in the reaction chamber was then welded shut. After activation, pressure-composition-temperature curves were obtained for the alloys. These are isothermal curves showing the equilibrium pressure above the hydride at a given hydrogen-to-metal atomic ratio. Hysteresis was observed between hydriding and dehydriding, which is a known phenomenon. Briefly, the curves were determined in the following way. The alloy was exposed to a known amount of hydrogen at a given temperature, and when equilibrium of pressure and temperature was reached the amount of hydrogen absorbed or desorbed was calculated. The equilibrium pressure was then plotted against the hydrogen-to-metal ratio. The system was "stepped" along the curve by exposing the hydride to increasing hydrogen pressures and forcing more hydrogen into the metal hydride. This stepping was continued until the hydride was saturated. To reverse the process, the saturated hydride was successively exposed to lower and lower hydrogen pressures, until no more hydrogen was desorbed. In this manner hydriding and dehydriding pressure-composition-temperature curves were established. The Table below reproduces values typical of some ferrovanadium alloys which may be used in constructing such pressure-composition-temperature curves.

TABLE

| HYDRIDING-DEHYDRIDING CHARACTERISTICS OF FERROVANADIUM ALLOYS | | | | | | | | | |
| --- | --- | --- | --- | --- | --- | --- | --- | --- | --- |
| 10% Fe-V | | | | | | | | | |
| hydriding (24° C.) | | | | | | | | | |
| pressure, $H_2$ (psia) | 10 | 25 | 43 | 62 | 90 | 120 | | | |
| hydrogen-to-metal (atom ratio) | .05 | .15 | .22 | .28 | .34 | .42 | | | |
| dehydriding (14° C.) | | | | | | | | | |
| pressure, $H_2$ (psia) | 83 | 42 | 25 | 17 | 13 | 10 | 5 | 2 | 1 |
| hydrogen-to-metal (atom ratio) | .38 | .37 | .36 | .35 | .33 | .31 | .24 | .14 | .12 |
| 20% Fe-V | | | | | | | | | |
| hydriding (15° C.) | | | | | | | | | |
| pressure, $H_2$ (psia) | 3 | 16 | 50 | 80 | 160 | | | | |
| hydrogen-to-metal (atom ratio) | .34 | .43 | .53 | .60 | .78 | | | | |
| dehydriding (20° C.) | | | | | | | | | |
| pressure, $H_2$ (psia) | 190 | 110 | 58 | 27 | 5 | 1.5 | | | |
| hydrogen-to-metal (atom ratio) | .81 | .65 | .46 | .43 | .30 | .19 | | | |

What is claimed is:

1. A method for forming a hydrided vanadium-iron alloy substantially corresponding to the formula $V_{(1-x)}Fe_xH_z$ where x ranges from about 0.05 to about 0.28, where H represents the hydrogen recoverable from said alloy at a temeprature less than about 200° C. at a pressure of at least 1 atmosphere, and z has a value up to about 1 for the controlled storage of hydrogen which comprises activating by heating in a vacuum at a temperature from about 400° C. to about 650° C. an alloy substantially of the formula $V_{(1-x)}Fe_x$ where x is as above defined and thereafter contacting said activated alloy with hydrogen at a pressure of at least 1 atmosphere and less than 50 atmospheres.

2. The method of claim 1 wherein x has a value of about 0.09.

3. The method of claim 1 wherein x has a value of about 0.19.

* * * * *